United States Patent [19]

Paterson

[11] 4,115,036
[45] Sep. 19, 1978

[54] PUMP FOR PUMPING LIQUID IN A PULSE-FREE FLOW

[75] Inventor: David Paterson, Copthorne, England

[73] Assignee: U.S. Philips Corporation, New York, N.Y.

[21] Appl. No.: 765,936

[22] Filed: Feb. 7, 1977

[30] Foreign Application Priority Data

Mar. 1, 1976 [GB] United Kingdom ............... 8049/76

[51] Int. Cl.² ................ F04B 17/04; F04B 43/12
[52] U.S. Cl. ................... 417/322; 417/412; 417/474
[58] Field of Search ............ 417/322, 412, 474, 475, 417/479, 410, 240

[56] References Cited

U.S. PATENT DOCUMENTS

| 3,029,743 | 4/1962 | Johns | 417/322 |
| 3,264,998 | 8/1966 | Dingman | 417/322 X |
| 3,511,583 | 5/1970 | Brown | 417/412 |
| 3,677,667 | 7/1972 | Morrison | 417/474 |
| 3,963,380 | 6/1976 | Thomas et al. | 417/322 |

Primary Examiner—Carlton R. Croyle
Assistant Examiner—R. E. Gluck
Attorney, Agent, or Firm—Frank R. Trifari; Jack E. Haken

[57] ABSTRACT

A peristaltic pump comprises two concentric cylinders at least one of which includes a plurality of piezoelectric elements which are successively electrically energized to produce moving seals in the region between the cylinders.

20 Claims, 4 Drawing Figures

PUMP FOR PUMPING LIQUID IN A PULSE-FREE FLOW

This invention relates to a pump for pumping liquids. In particular, this invention relates to a substantially pulse-free, cylindrical pump which operates in a peristaltic manner on a cylinder to give a continuous flow of relatively small quantities of a liquid from an inlet port to an outlet port of the pump.

There has long been a need in liquid dispensing applications for an efficient pulse-free pump for pumping liquids in a continuous manner and with an immediate full flow response on starting.

In chemical measuring applications, for example liquid chromatography for the routine quality control or trace analysis of pharmaceuticals, food, oil and plastics additives, a pulse-less flow of a liquid under analysis or of a solvent which contains a substance under analysis is frequently required. Liquids can be delivered from reciprocating piston pumps but a damping system to reduce pulsing over the whole pressure range used is generally necessary.

It is known that piezoelectric materials can be polarised in different directions and that they can convert electrical energy into mechanical energy relative to the direction of polarisation. The publication entitled, "Piezoelectric ceramics", Editors J. Van Randeraat and R. E. Setterington, Second Edition, January 1974, Mullard Limited, London, discloses that mechanical movements may be produced by a cylindrically shaped piezoelectric material when a suitable voltage is applied so that a piezoelectric cylinder can be made to either shorten or lengthen (see FIG. 2.2d, page 6).

It is also known from U.K. Patent Specification No. 1,240,286 that a ceramic piezoelectric material in response to an applied voltage can be used for controlling the flow of a liquid medium by being coupled with a trapped body of non-compressible fluid to a smaller output piston.

The output piston is arranged to drive a rotary shaft or the piezoelectric element is used to operate a pilot valve to control the flow. No description in the aforementioned publications is made however to the production of a medium flow by the mechanical application of a ceramic piezoelectric material.

One object of the present invention is to provide a pump for pumping liquids in a substantially pulse-free flow which is quick in response time to produce a full flow of liquid at a constant pressure.

A further object of the invention is to provide a pump which is relatively small in size when compared with conventional piston pumps which produce a similar rate of flow. Characteristically, pumps according to the invention, in general, are approximately 1,000 $cm^3$ in size and are silent in operation.

Another object of the present invention is to provide a pump which is vibrationless in operation and substantially free from moving parts typically found in standard reciprocating piston type pumps and in flexible peristaltic-tube squeezing roller type pumps. Thus, pumps of the present invention because of the lack of moving parts and the materials used in the construction of the pumps remain inherently clean to the liquid or liquids pumped.

According to the invention there is provided a substantially pulse free, cylindrical pump which operates in a peristaltic manner on a cylinder to give a continuous flow of relatively small quantities of a liquid from an inlet port to an outlet port of the pump which pump comprises two concentric cylinders in which at least one cylinder is formed from a piezoelectric ceramic material polarised in the radial direction and divided in the axial direction into at least three piezoelectric elements in the form of circumferential rings separated by circumferential grooves on the surface of the cylinder remote from an annular space between the two cylinders, an electrical power supply in separate electrical contact with each ring and a switching device which completes an electrical circuit between the electrical power supply and each ring wherein each ring in succession or one group of rings selected from at least three groups of rings in succession when energised electrically expand radially in a progressive sequence to fill the adjacent part of the annular space between the two cylinders and forms a moving seal which moves progressively from the inlet port to the outlet port to expel a first quantity of liquid therefrom. This operation may be repeated at any desired interval depending upon the volume of liquid required. Subsequent operations may be commenced in sequence with the proceeding operation providing that re-energised rings follow a predetermined number of de-energised rings of the proceeding seal. One ring or one group of rings immediately upstream to the first or subsequent moving seals produced is therefore de-energised in a progressive manner as the seals move towards the outlet port of the pump. In this manner, a series of annular spaces forms between the two concentric cylinders with one annular space behind each moving seal and with each annular space filled with the liquid being pumped.

Thus, according to one embodiment of the invention there is provided a substantially pulse free pump in which the or each additional moving seal is formed upstream to a proceeding moving de-energised ring or group of rings and wherein said moving seals are uniformly spaced from adjacent moving seals by simultaneously energising the same number of rings leading each moving seal as are de-energised on the trailing side of the moving seal.

In one embodiment of the invention the inner cylinder of the two cylinders is a piezoelectric ceramic material and is provided with piezoelectric elements in the form of circumferential rings on the internal surface of the cylinder.

In an alternative embodiment the outer cylinder of the two cylinders is of a piezoelectric material and is provided with piezoelectric elements in the form of circumferential rings. The output of the pump may be increased considerably for any one unit size if both the internal and the external concentric cylinders are of piezoelectric materials with piezoelectric elements in the form of circumferential rings.

Any suitable piezoelectric ceramic material may be used providing that the piezoelectric ceramic can be moulded or machined into a suitable cylindrical shape with a polarization in the radial direction. As piezoelectric ceramics are hard, rigid and relatively chemically inert they can be used to withstand a wide range of liquid pressures and organic and inorganic liquids.

Preferably, the piezoelectric ceramic material is lead zirconate titanate. However, potassium sodium niobate, lead lanthanum titanate and other piezoelectric ceramic materials are equally suitable.

The surface of any selected piezoelectric ceramic material should be such that it is chemically compatible with the inorganic or organic liquid being pumped. Suitable surfaces as well as being chemically inert to the liquid pumped should in addition be readily wetted by it. Liquids which are particularly suitable for pumping by the pump according to the invention are organic liquids, such as, liquid aliphatic and aromatic compounds, for example, saturated and unsaturated hydrocarbons, such as, pentane, hexane, heptane and octane; ketones, such as acetone and methyl ethyl ketone; alcohols such as methyl alcohol and ethyl alcohol; phenols; fatty acids and derivatives thereof such as esters and simple mixtures of two or more of these liquids, if desired, in the presence of water to form aqueous solutions.

When the pump comprises two concentric cylinders of which only one cylinder is of a piezoelectric ceramic material the other cylinder is an inert, rigid substance which may be selected from the group comprising a metallic material, such as, stainless steel, chromium, nickel, molybdenum, platinum, gold or silver or alloys thereof, a rigid inert non metallic material, such as, glasses or ceramic materials and a rigid inert plastics material, such as, polytetrafluoroethylene, polyvinylchloride or a polyalkane. The expression "inert" as used throughout the specification is understood to mean a material is used which is inert to the liquid or liquids being pumped. In the parts of the pump which are made from a piezoelectric ceramic material the appropriate cylindrical surface or surfaces of the two concentric cylinders may be formed into annular rings by cutting grooves in the appropriate cylindrical surface(s) to form a series of minor and major diameters. The number of grooves cut is dependent upon the length of the cylinder(s) of the pump and the desired number of piezoelectric elements in the form of rings to be energised. For example, the total number of rings on one cylinder may be between 3 to 30. Three rings is the minimal number of energisable rings for the sequential pumping of the liquid. However, the upper limit is determined only by the dimensions of the pump required.

Preferably, both cylinders are of a piezoelectric ceramic material and both then may have an equal number of energisable rings. The rings of one or both cylinders may also enclose one cavity between two moving seals or four moving seals of the two cylinders and wherein the said seals may each comprise from at least one energised ring to not more than 14 energised rings when the total number of rings in each cylinder is 30.

The electric power supply is applied to an electrically conducting layer on the surface of the piezoelectric material. Preferably all the cylindrical surfaces of the piezoelectric material are covered with an electrically conducting layer and electrical connections are made to the layer at each ring and to the boundary of the layers.

The electrical power supply applied may not exceed the depolarisation voltage of the piezoelectric ceramic material used. In general, the electrical power supplied is not greater than 500 volts per mm. of thickness of the piezoelectric ceramic material. Under operating conditions other known limits of the piezoelectric materials must not be exceeded. Thus, the temperature of the piezoelectric ceramic material must be kept below the Curie point i.e. above the temperature at which the crystal structure of the ceramic material has a centre of symmetry and therefore possesses no electric dipole moment. The material also is not subject to strong stray alternating electric fields or direct electric currents which oppose the direction of polarisation and neither is the material subjected to excessive mechanical stresses e.g. above the known limits for the specific piezoelectric materials used. Electrical leads to each ring preferably pass along the centre of the inner of the two concentric tubes to make contact with each ring separately. Groups of rings may then be selected for sequential energisation by selecting the appropriate leads and connecting to a switching device.

The switching device in turn is connected to an electric power supply. A suitable electrical power supply is at 5,000 volts and up to 100 Hertz. Preferably the power supply is at 3,000 volts and 25 Hertz.

The switching device which connects the power supply and each ring may be electromechanically operated or it may be a solid-state switch so that the rings are contacted successively either singly or in groups.

The switching device may therefore be used to control the amount of liquid passing through the pump per unit of time by controlling the rate (or frequency) with the phase being kept constant at which the rings are energised.

The amount of liquid which passes through the pump per unit of time may also be controlled by operating the switching device at a constant frequency whilst the phase is varied.

Alternatively the amount of liquid passing through the pump per unit time may be controlled by the switching device by varying the ratio of rings energised to the rings de-energised in any one sequence.

A constant flow rate of up to 12 ml. per minute of an inert liquid of specific gravity between 0.60 and 1.1 can be produced from a single piezoelectric cylindrical pump with a diameter of 38 mm. and 0.003 mm. radial clearance between the two concentric cylinders with an applied potential difference of 3,000 volts at 25 Hertz.

The rate of pumping of a pump according to the invention can be varied by any of the aforesaid methods to each concentric cylinder separately. The annular space between the two cylinders may be sealed by two or more moving seals which are spaced apart by successively energising matching rings on each cylinder so that each moving seal is produced by an increase in the radius of the outer surface of the inner cylinder and a decrease in the radius of the inner surface of the outer cylinder.

In order that the present invention may be more clearly understood and readily carried into effect an embodiment thereof will now be described by way of example with reference to the accompanying drawings, in which.

Figure 1:
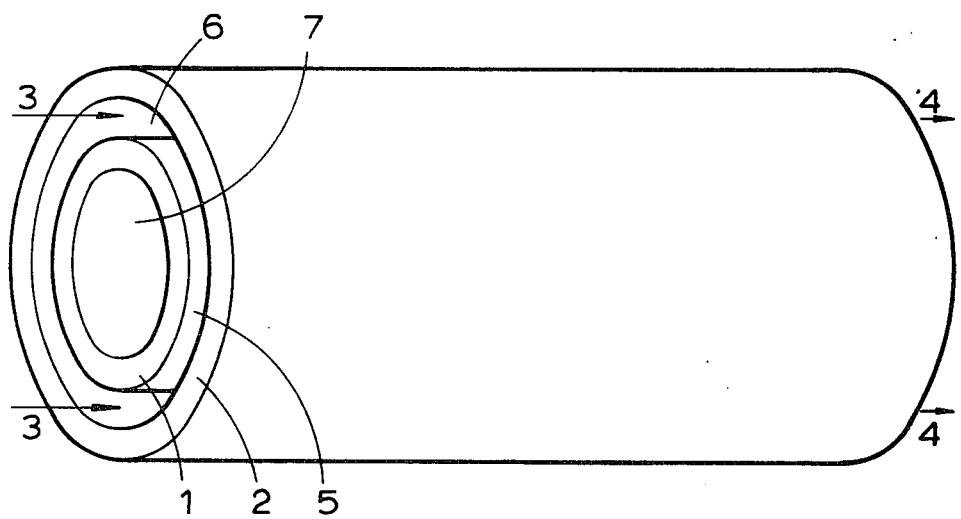
FIG. 1 is a part end view of two concentric cylinders of the pump.

The pump according to FIG. 1 is operated by trapping small quantities of liquid between concentric cylinders 1 and 2 and passes the liquid from an inlet port 3 to an outlet port 4. Either or both of the concentric cylinders 1 and 2 may be formed from a piezoelectric ceramic material. When only one of concentric cylinders 1 or 2 is of a piezoelectric ceramic material the other cylinder is an inert, rigid metallic or an inert, rigid plastics material such as stainless steel or polytetrafluoroethylene respectively. The distance between the outer surface 5 of the inner cylinder 1 and the inner surface 6 of the outer cylinder 2 is 0.003 mm. and the outer diameter of inner cylinder 1 is 38 mm. The overall length of the two concentric tubes 1, 2 is 76 mm. The cylinder 1 has an internal surface 7.

Figure 2:
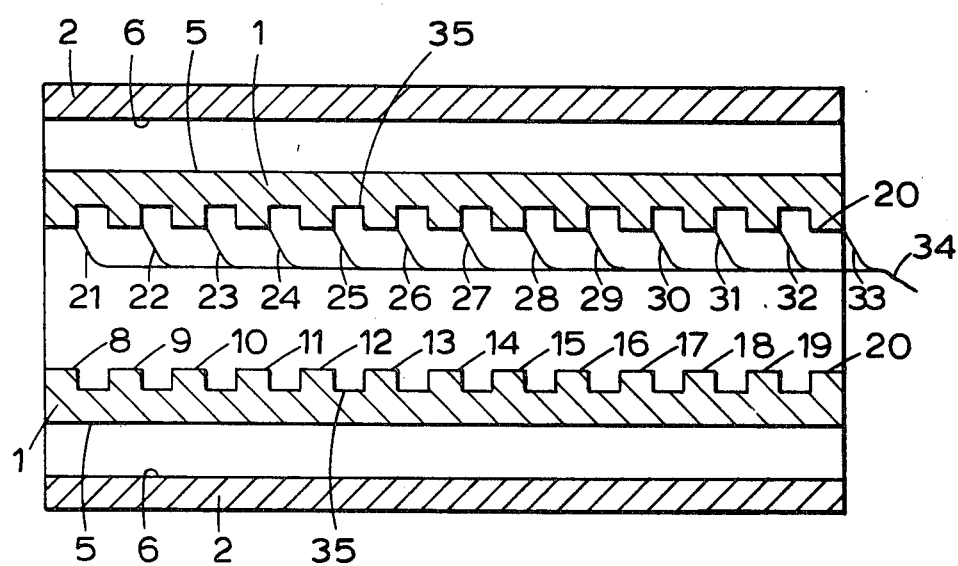
FIG. 2 is a longitudinal section of two concentric cylinders of the pump in which the inner cylinder is a piezoelectric ceramic material.

FIG. 2 shows a longitudinal section of the two concentric cylinders 1, 2 in which the inner cylinder 1 is a piezoelectric material and the outer cylinder 2 is of stainless steel. The piezoelectric ceramic material of cylinder 1 is lead zirconate titanate polarised in the radial direction.

The internal surface 7 of the piezoelectric ceramic cylinder 1 is formed into a number of separate rings 8, 9, 10, 11, 12, 13, 14, 15, 16, 17, 18, 19, and 20 which are in separate electrical contact with leads 21, 22, 23, 24, 25, 26, 27, 28, 29, 30, 31, 32 and 33 shown for clarity as joining a common multiple lead 34. The separate rings, 8, 9, 10, 11, 12, 13, 14, 15, 16, 17, 18, 19 and 20 are formed in the inner surface of the cylinder 1 by cutting grooves one of which is indicated at 35.

Figure 2A:
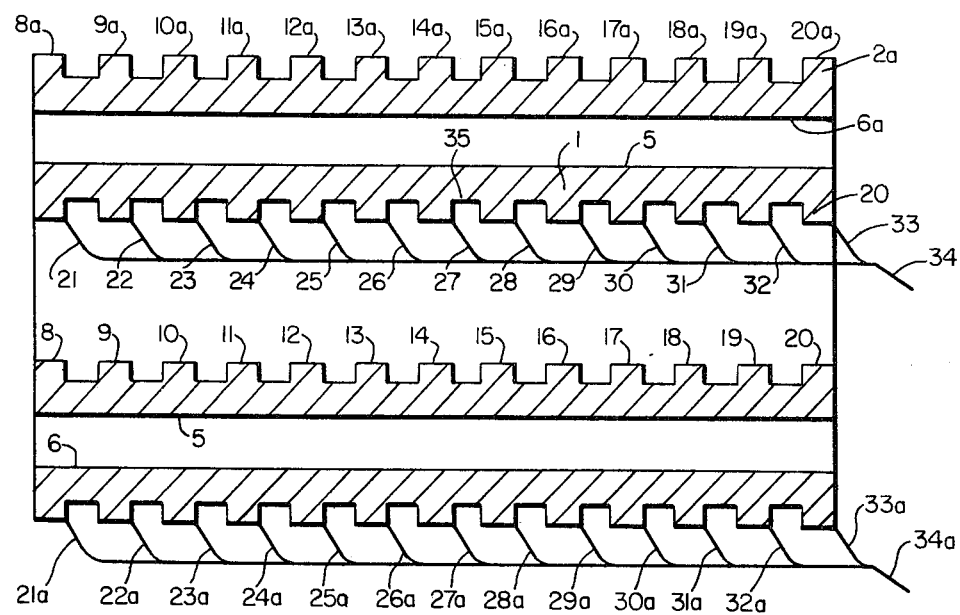
FIG. 2A is a section of a pump in which both cylinders are piezoelectric material

FIG. 2A is an alternate embodiment of the pump wherein both the inner cylinder 1 and the outer cylinder 2a comprise piezoelectric material. The outer surface of the outer cylinder is formed into separate rings 8a, 9a, 10a, 11a, 12a, 13a, 14a, 15a, 16a, 17a, 18a, 19a and 20a which are contacted with leads 21a, 22a, 23a, 24a, 25a, 26a, 27a, 28a, 29a, 30a, 31a, 32a and 33a; joining in a common lead 34a in the manner described above with respect to FIG. 2.

Figure 3:
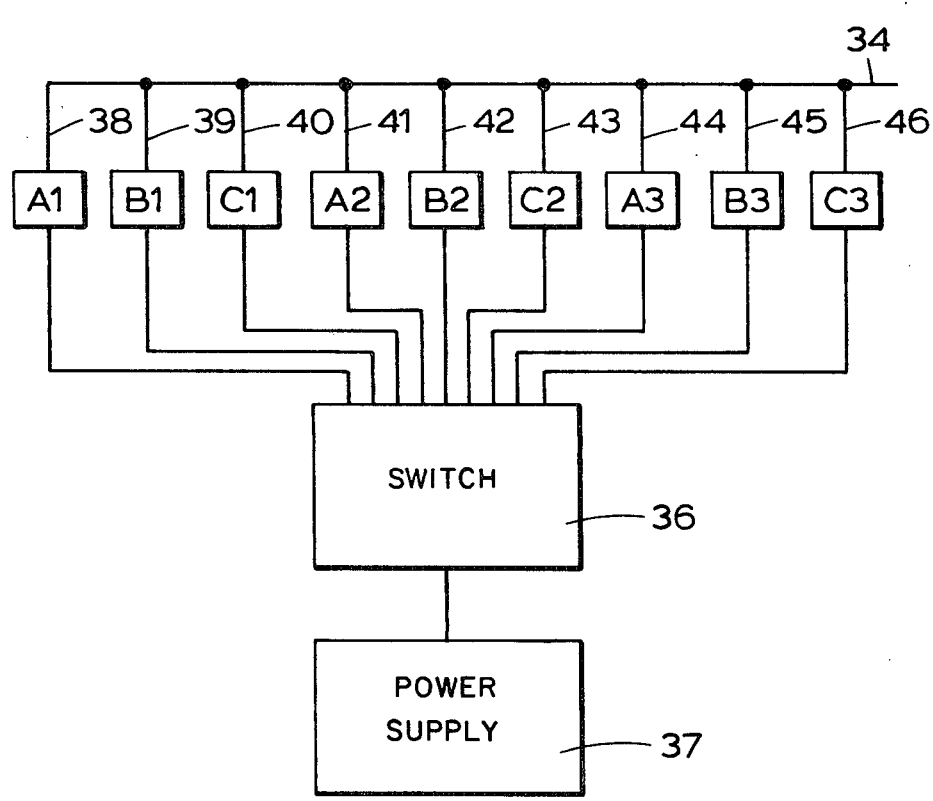
FIG. 3 illustrates a switching device and a power supply for connecting to one or both cylinders of FIGS. 1 or 2.

FIG. 3 illustrates a switching device 36 and an electrical power supply 37 with electrical connections 38, 39, 40, 41, 42, 43, 44, 45 and 46 connected to the common multiple lead 34. The common multiple lead 34 may be connected to the rings of the inner cylinder or to rings of the outer cylinder when of a piezoelectric ceramic material. Two common multiple leads 34 may be connected to the concentric cylinders in a separate manner if desired. The power supply 37 provides 3,000 volts at 25 Hertz to the switching device 36. Nine leads are indicated by 38, 39, 40, 41 42, 43, 44, 45, and 46 as leaving the switching device grouped into three groups A1, B1, C1; A2, B2, C2, and A3, B3, C3, with a minimum of three leads in each group ABC. The switching device may energise the leads separately or each of the three in sequence.

In operation three rings connected to leads, A1, B1, C1 are energised to close the annular space between cylinders 1 and 2. A fourth ring A2 is then energised and the first ring A1 is de-energised. A quantity of liquid is thus propagated in front of the closed space or seal produced. Subsequently a fifth ring B2 is energised and the second ring B1 is de-energised followed by C2 energised and C1 de-energised; A3 energised and A2 de-energised; B3 energised and B2 de-energised, and C3 energised C2 de-energised to expel the quantity of fluid from the outlet port of the pump.

The series may then be repeated or a second series spaced from the first series can expel subsequent quantities of liquid in a continuous flow.

What we claim is:

1. A substantially pulse free, cylindrical pump which operates in a peristaltic manner on a cylinder to give a continuous flow of relatively small quantities of a liquid from an inlet port to an outlet port of the pump, which pump comprises two concentric cylinders in which at least one cylinder is formed from a piezoelectric ceramic material polarized in the radial direction and divided in the axial direction into at least three piezoelectric elements, each of which elements include at least one circumferential ring, separated by circumferential grooves on the surface of the cylinder remote from an annular space between the two cylinders; an electrical power supply in separate electrical contact with each ring and a switching device which completes an electrical circuit between the electrical power supply and each ring; wherein each element in seccession when energized electrically expands, radially in progressive sequence to fill the adjacent part of the annular space between the two cylinders and forms a moving seal which moves progressively from the inlet port of the outlet port to expel a first quantity of liquid therefrom.

2. A substantially pulse free pump according to claim 1 in which one element immediately upstream to the moving seals produced is de-energized in a progressive manner as the seals move towards the outlet port of the pump.

3. A substantially pulse free pump according to claim 2 in which at least one additional moving seal is formed upstream to a preceeding moving de-energized element, each additional moving seal being uniformly spaced from adjacent moving seals by simultaneously energizing the same number of rings lending each moving seal as are de-energized on the trailing side of the moving seal.

4. A substantailly pulse free pump according to claim 1 in which the inner cylinder of the two cylinders is of a piezoelectric ceramic material and is provided with piezoelectric elements in the form of circumferential rings on its internal surface.

5. A substantially pulse free pump according to claim 1 in which the outer cylinder of the two cylinders is of piezoelectric ceramic material and is provided with piezoelectric elements in the form of circumferential rings.

6. A substantially pulse free pump according to claim 1 in which the piezoelectric ceramic material is selected from the group consisting of lead zirconate titerate, potassium sodium niobate, and lead lanthanum titanate.

7. A substantially pulse free pump according to claim 1 in which the total number of rings on one of the two cylinders is between 3 to 30.

8. A substantially pulse free pump according to claim 7 in which two moving seals are formed which enclose a corresponding moving cavity which cavity contains the liquid being pumped, each of said seals comprising from at least one energized ring to not more than 14 energized rings respectively.

9. A substantially pulse free pump according to claim 1 in which the electrical power supply is not greater than 500 volts per mm of ceramic thickness.

10. A substantially pulse free pump according to claim 9 in which the electrical power supply is at a voltage of 5000 volts and the switching device successively connects the elements at a frequency less than or equal to 100 Hertz.

11. A substantially pulse free pump according to claim 9 in which the voltage is 3000 volts at 25 Hertz.

12. A substantially pulse free pump according to claim 1 in which the switching device is an electromechanically operated switch.

13. A substantially pulse free pump according to claim 1 in which the switching device controls the rate (or frequency) at which the rings are energized and the phase is kept constant in order to vary the amount of liquid passing through the pump per unit time.

14. A substantially pulse free pump according to claim 12 in which the switching device operates at a constant frequency and the phase is varied to alter the amount of liquid passing through the pump per unit time.

15. A substantially pulse free pump according to claim 1 in which the switching device controls the ratio of energized rings to de-energized rings in order to control the amount of liquid passing through the pump per unit time.

16. A substantially pulse free pump according to claim 1 in which one cylinder is formed from a piezoelectric ceramic material and the other cylinder is of a rigid inert substance selected from the group consisting of stainless steel, chromium, nickel, molybdenum, platinum, gold, silver, alloys thereof, glasses, ceramics, and rigid inert plastics.

17. A substantially pulse free pump according to claim 1 in which the surfaces of the piezoelectric elements are coated with an electrically conductive material and electrical connections are made to the coating at each ring and to the appropriate layer at the boundary of the concentric cylinders.

18. A substantially pulse free pump according to claim 1 in which both cylinders are formed of a piezoelectric ceramic material, the annular space between the two cylinders being sealed by two or more moving seals spaced apart by successively energizing matching rings on each cylinder so that each moving seal is produced by an increase in the radius of the outer surface of the inner cylinder and a decrease in the radius of the inner surface of the outer cylinder.

19. A substantially pulse free pump according to claim 1 in which the switching device is a solid state switch.

20. A substantially pulse free pump according to claim 1 wherein each element includes a group of rings.

* * * * *